United States Patent
Surnilla et al.

(10) Patent No.: US 9,714,619 B2
(45) Date of Patent: *Jul. 25, 2017

(54) METHODS AND SYSTEMS FOR INDICATING WATER AT AN OXYGEN SENSOR BASED ON SENSOR HEATER POWER CONSUMPTION

(71) Applicant: Ford Global Technologies, LLC, Dearborn, MI (US)

(72) Inventors: Gopichandra Surnilla, West Bloomfield, MI (US); Richard E. Soltis, Saline, MI (US); Dan A. Makled, Dearborn, MI (US); Timothy Joseph Clark, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,145

(22) Filed: Apr. 12, 2016

(65) Prior Publication Data
US 2016/0222897 A1    Aug. 4, 2016

Related U.S. Application Data

(63) Continuation of application No. 13/971,714, filed on Aug. 20, 2013, now Pat. No. 9,309,838.

(51) Int. Cl.
*F02B 29/04* (2006.01)
*F02D 41/00* (2006.01)
(Continued)

(52) U.S. Cl.
CPC .......... *F02D 41/0065* (2013.01); *F02B 29/04* (2013.01); *F02D 41/0002* (2013.01); *F02D 41/144* (2013.01); *F02D 41/1494* (2013.01); *F02M 26/04* (2016.02); *F02M 26/44* (2016.02); *F02M 26/45* (2016.02); *F02M 26/49* (2016.02); *F02P 5/1502* (2013.01); *G01M 15/02* (2013.01); *F02D 41/0007* (2013.01); *F02D 41/0072* (2013.01); *F02D 41/1495* (2013.01); *F02D 2200/0418* (2013.01); *F02M 26/46* (2016.02); *F02M 2026/001* (2016.02); *Y02T 10/42* (2013.01); *Y02T 10/46* (2013.01)

(58) Field of Classification Search
CPC ........ F02M 26/05–26/07; F02M 26/22–26/32; F02M 26/45; F02M 26/46; F02M 26/49; F02M 2026/004
USPC ....... 123/568.12, 568.16; 73/114.31, 114.73, 73/114.74
See application file for complete search history.

(56) References Cited

U.S. PATENT DOCUMENTS

| 4,168,683 A | 9/1979 | Hata et al. |
| 5,566,071 A | 10/1996 | Akazaki et al. |

(Continued)

*Primary Examiner* — Erick Solis
(74) *Attorney, Agent, or Firm* — Julia Voutyras; McCoy Russell LLP

(57) ABSTRACT

Methods and systems are provided for indicating water at an oxygen sensor based on power consumption of a heating element of the oxygen sensor. In one example, water may be indicated at an oxygen sensor positioned in an intake of an engine responsive to power consumption of the heating element of the oxygen sensor increasing above a baseline level. Engine operating parameters may then be adjusted based on the water indication and the power consumption.

20 Claims, 3 Drawing Sheets

(51) Int. Cl.
  *F02M 26/44*   (2016.01)
  *G01M 15/02*   (2006.01)
  *F02D 41/14*   (2006.01)
  *F02P 5/15*    (2006.01)
  *F02M 26/04*   (2016.01)
  *F02M 26/49*   (2016.01)
  *F02M 26/45*   (2016.01)
  *F02M 26/46*   (2016.01)
  *F02M 26/00*   (2016.01)

(56)       References Cited

U.S. PATENT DOCUMENTS

| | | | |
|---|---|---|---|
| 6,223,735 B1 | 5/2001 | Poggio et al. | |
| 6,742,379 B2 | 6/2004 | Matsubara et al. | |
| 7,715,976 B1 * | 5/2010 | Xiao | F02D 41/0072 |
| | | | 123/406.48 |
| 8,010,276 B2 | 8/2011 | Oehlerking | |
| 8,296,042 B2 | 10/2012 | Xiao et al. | |
| 8,397,489 B2 | 3/2013 | Webb et al. | |
| 8,417,413 B2 | 4/2013 | Ishiguro et al. | |
| 8,438,899 B2 | 5/2013 | Zawacki et al. | |
| 8,857,155 B2 | 10/2014 | Surnilla et al. | |
| 9,133,757 B2 | 9/2015 | Glugla et al. | |
| 9,163,575 B2 | 10/2015 | Pursifull | |
| 9,181,887 B2 | 11/2015 | Surnilla et al. | |
| 9,273,621 B2 | 3/2016 | Surnilla et al. | |
| 9,309,838 B2 * | 4/2016 | Surnilla | F02D 41/144 |
| 9,328,679 B2 | 5/2016 | Clark et al. | |
| 9,359,964 B2 | 6/2016 | Glugla et al. | |
| 2005/0072411 A1 * | 4/2005 | Cullen | F02D 41/021 |
| | | | 123/690 |
| 2010/0179745 A1 | 7/2010 | Nakayama et al. | |
| 2011/0054762 A1 | 3/2011 | Nakayama et al. | |
| 2011/0073086 A1 | 3/2011 | Bahlo et al. | |
| 2011/0154891 A1 | 6/2011 | Yoshimura et al. | |
| 2012/0174578 A1 | 7/2012 | Vigild et al. | |
| 2012/0215402 A1 | 8/2012 | Kanemaru et al. | |
| 2012/0317959 A1 | 12/2012 | Levijoki et al. | |
| 2014/0150760 A1 | 6/2014 | Surnilla et al. | |
| 2015/0047339 A1 | 2/2015 | Rollinger et al. | |
| 2015/0047603 A1 | 2/2015 | Surnilla et al. | |
| 2015/0075502 A1 | 3/2015 | Surnilla et al. | |
| 2015/0101564 A1 | 4/2015 | Surnilla et al. | |

* cited by examiner

METHODS AND SYSTEMS FOR INDICATING WATER AT AN OXYGEN SENSOR BASED ON SENSOR HEATER POWER CONSUMPTION

CROSS REFERENCE TO RELATED APPLICATIONS

The present application is a continuation of U.S. patent application Ser. No. 13/971,714, entitled "METHODS AND SYSTEMS FOR INDICATING WATER AT AN OXYGEN SENSOR BASED ON SENSOR HEATER POWER CONSUMPTION," filed on Aug. 20, 2013, now U.S. Pat. No. 9,309,838, the entire contents of which are hereby incorporated by reference for all purposes.

BACKGROUND/SUMMARY

Engine systems may utilize recirculation of exhaust gas from an engine exhaust system to an engine intake system, a process referred to as exhaust gas recirculation (EGR), to reduce regulated emissions. For example, a turbocharged engine system may include a low-pressure (LP) EGR system which recirculates exhaust gas from the exhaust system to the intake passage upstream of a turbocharger compressor. An intake oxygen sensor (IAO2) may be located in the engine intake downstream from the compressor and a charge air cooler to provide an indication of EGR flow based on a measured water content of the intake air.

The inventors herein have recognized various issues with the above system. In particular, intake oxygen sensor (IAO2) measurements for determining exhaust gas recirculation (EGR) in low pressure EGR vehicle systems may give an inaccurate indication of the EGR flow if water from another source contacts the IAO2. For example, when the IAO2 is positioned downstream of the charge air cooler (CAC), condensate formed at the CAC may exit the CAC and splash against the IAO2. As a result, the IAO2 may measure a higher water concentration than what may actually be attributed to the water vapor content of the EGR in the intake air. A higher EGR flow rate may then be indicated based on the output of the IAO2 sensor than the actual EGR flow rate. In some examples, using this inaccurate EGR measurement may trigger diagnostic routines, as well as inaccurately adjusting spark timing or other combustion parameters.

In one example, the issues described above may be addressed by a method for indicating water at an oxygen sensor positioned in an engine intake based on a transient increase in power consumed by a heating element of the oxygen sensor. Specifically, the oxygen sensor may be positioned downstream of a charge air cooler (CAC). When water contacts the oxygen sensor, the power consumption of the heating element may increase. Indicating water at the oxygen sensor may include indicating an amount of water at the oxygen sensor based on an amount of the transient increase in power consumed by the heating element. For example, as the power consumption of the heating element increases farther above a baseline power consumption level, the amount of water indicated at the oxygen sensor may increase. In response to an indication of water at the oxygen sensor, one or more of spark timing and a position of an intake throttle may be adjusted. Additionally, in response to the indication of water at the oxygen sensor, EGR diagnostics and/or oxygen sensor heating element diagnostics may be disabled. In one example, disabling EGR diagnostics may include disabling engine operating parameter adjustments based on EGR flow estimates, the EGR flow estimates based on oxygen sensor output. In this way, when water is indicated at the oxygen sensor, EGR flow estimates may not be used to adjust spark timing or other combustion parameters, or trigger diagnostic routines. As a result, combustion stability and accuracy of engine control may be increased. Further, adjusting the intake throttle and/or spark timing while water is indicated at the oxygen sensor may reduce combustion instability due to the ingestion of water at the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for indicating water at an oxygen sensor based on power consumption of a heating element of the oxygen sensor. Specifically, the oxygen sensor may be positioned in an engine intake, downstream of a charge air cooler (CAC) of an engine system, such as the engine system of FIG. 1. As such, the oxygen sensor may be referred to herein as an intake oxygen sensor (IAO2). When water (e.g., water droplets) contacts the IAO2, power consumption of the heating element (e.g., heater) of the IAO2 may increase in order to maintain a set point temperature of the IAO2. As such, when the power consumption increases a threshold amount above a baseline power consumption level, water may be indicated at the IAO2. FIG. 2 shows a method for adjusting engine operation based on power consumption of the IAO2 heating element. Specifically, in response to water indication, an engine controller may adjust engine operating parameters and/or disable engine diagnostics. For example, when water is contacting the IAO2, exhaust gas recirculation (EGR) flow estimates based on IAO2 output may decrease in accuracy, thereby resulting in reduced accuracy of engine control. Thus, in one example, in response to water indication the engine controller may disable engine operating parameter adjustments in response to EGR flow estimates. Additionally, when water is indicated at the IAO2 combustion stability of the engine may decrease upon ingestion of the water. Thus, in another example, in response to water indication at the IAO2, the engine controller may adjust airflow to the intake manifold and/or spark timing in order to increase combustion stability during the water ingestion. Example engine operating parameter adjustments based on power consumption of the IAO2 heating element are shown at FIG. 4.

Figure 1:
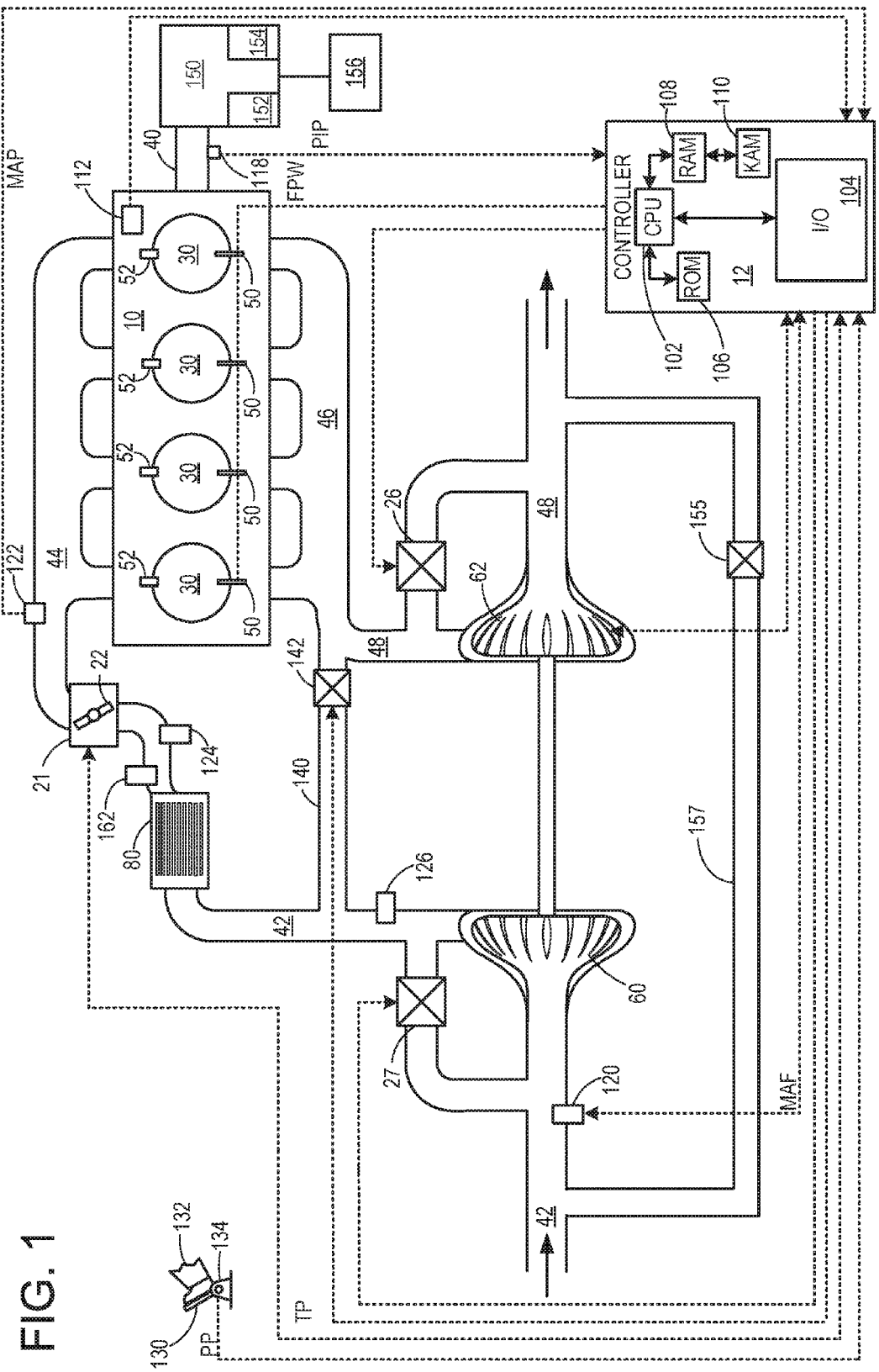
FIG. 1 is a schematic diagram of an example engine system including an oxygen sensor positioned downstream of a charge air cooler.
Figure 2:
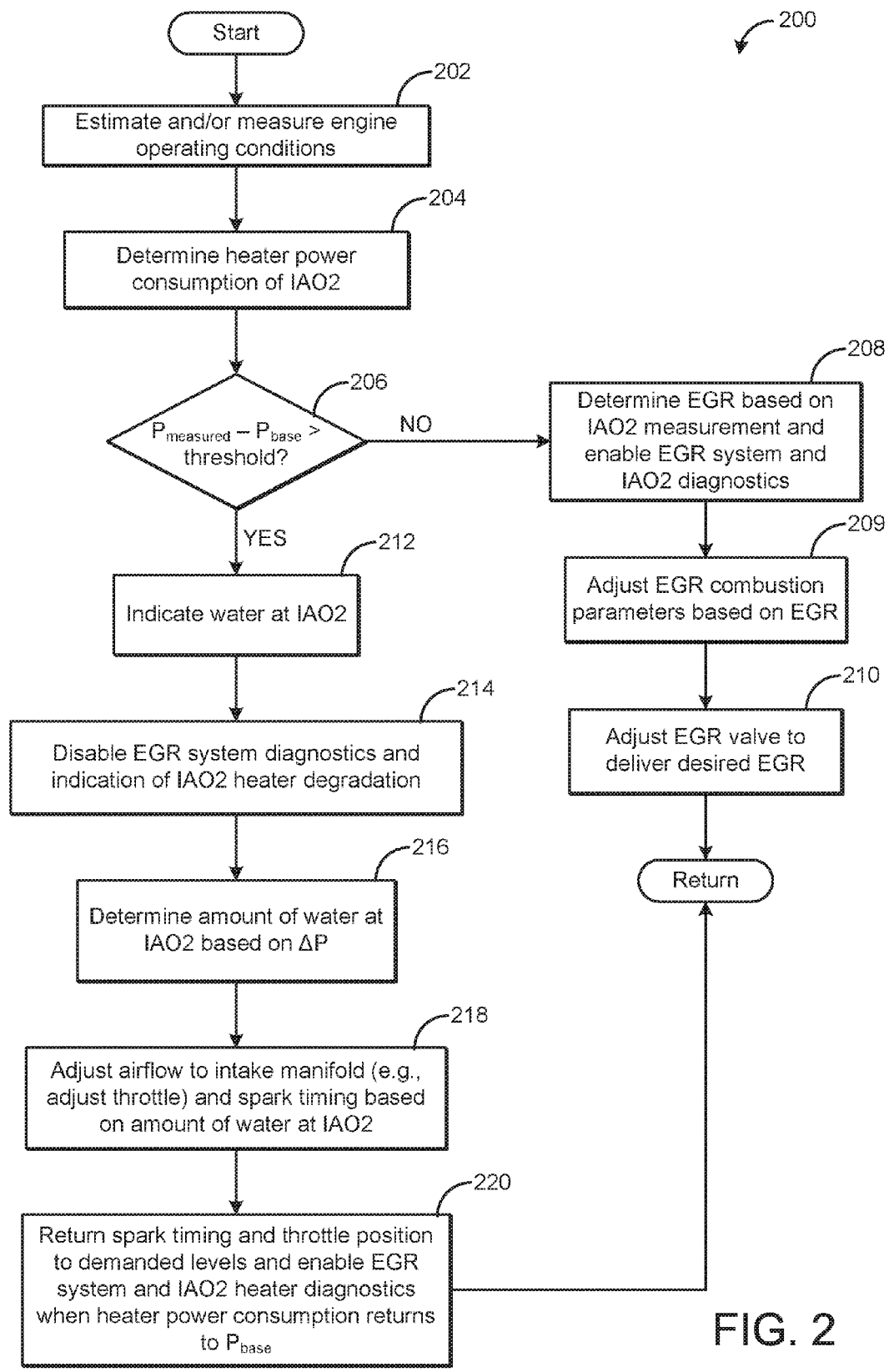
FIG. 2 is a flow chart of a method for indicating water at an oxygen sensor and adjusting engine operating conditions responsive to the water indication.

FIG. 1 is a schematic diagram showing an example engine 10, which may be included in a propulsion system of an automobile. The engine 10 is shown with four cylinders or combustion chambers 30. However, other numbers of cylinders may be used in accordance with the current disclosure. Engine 10 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Each combustion chamber (e.g., cylinder) 30 of the engine 10 may include combustion chamber walls with a piston (not shown) positioned therein. The pistons may be coupled to a crankshaft 40 so that reciprocating motion of the piston is translated into rotational motion of the crankshaft. The crankshaft 40 may be coupled to at least one drive wheel of a vehicle via an intermediate transmission system 150. Further, a starter motor may be coupled to crankshaft 40 via a flywheel to enable a starting operation of engine 10. The crankshaft 40 may also be used to drive an alternator (not shown in FIG. 1).

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have four available gears, where transmission gear four (transmission fourth gear) is the highest available gear and transmission gear one (transmission first gear) is the lowest available gear. In other embodiments, the vehicle may have more or less than four available gears. A controller may vary the transmission gear (e.g., upshift or downshift the transmission gear) to adjust an amount of torque conveyed across the transmission and torque converter to vehicle wheels 156 (that is, an engine shaft output torque).

As the transmission shifts to a lower gear, the engine speed (Ne or RPM) increases, increasing engine airflow. An intake manifold vacuum generated by the spinning engine may be increased at the higher RPM. In some examples, downshifting may be used to increase engine airflow and purge condensate built up in a charge air cooler (CAC) 80.

The combustion chambers 30 may receive intake air from the intake manifold 44 and may exhaust combustion gases via an exhaust manifold 46 to an exhaust passage 48. The intake manifold 44 and the exhaust manifold 46 can selectively communicate with the combustion chamber 30 via respective intake valves and exhaust valves (not shown). In some embodiments, the combustion chamber 30 may include two or more intake valves and/or two or more exhaust valves.

Fuel injectors 50 are shown coupled directly to the combustion chamber 30 for injecting fuel directly therein in proportion to the pulse width of signal FPW received from controller 12. In this manner, the fuel injector 50 provides what is known as direct injection of fuel into the combustion chamber 30; however it will be appreciated that port injection is also possible. Fuel may be delivered to the fuel injector 50 by a fuel system (not shown) including a fuel tank, a fuel pump, and a fuel rail.

In a process referred to as ignition, the injected fuel is ignited by known ignition means such as spark plug 52, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. In one example, spark may be retarded during a tip-in. In an alternate embodiment, compression ignition may be used to ignite the injected fuel.

The intake manifold 44 may receive intake air from an intake passage 42. The intake passage 42 includes a throttle 21 having a throttle plate 22 to regulate flow to the intake manifold 44. In this particular example, the position (TP) of the throttle plate 22 may be varied by the controller 12 to enable electronic throttle control (ETC). In this manner, the throttle 21 may be operated to vary the intake air provided to the combustion chambers 30. For example, the controller 12 may adjust the throttle plate 22 to increase an opening of the throttle 21. Increasing the opening of the throttle 21 may increase the amount of air supplied to the intake manifold 44. In an alternate example, the opening of the throttle 21 may be decreased or closed completely to shut off airflow to the intake manifold 44. In some embodiments, additional throttles may be present in intake passage 42, such as a throttle upstream of a compressor 60 (not shown).

Further, in the disclosed embodiments, an exhaust gas recirculation (EGR) system may route a desired portion of exhaust gas from the exhaust passage 48 to the intake passage 42 via an EGR passage, such as high pressure EGR passage 140. The amount of EGR provided to the intake passage 42 may be varied by the controller 12 via an EGR valve, such as high pressure EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger through EGR passage 140. FIG. 1 also shows a low pressure EGR system where EGR is routed from downstream of turbine of a turbocharger to upstream of a compressor of a turbocharger through low pressure EGR passage 157. A low pressure EGR valve 155 may control the amount of EGR provided to the intake passage 42. In some embodiments, the engine may include both a high pressure EGR and a low pressure EGR system, as shown in FIG. 1. In other embodiments, the engine may include either a low pressure EGR system or a high pressure EGR system. When operable, the EGR system may induce the formation of condensate from the compressed air, particularly when the compressed air is cooled by the charge air cooler, as described in more detail below.

The engine 10 may further include a compression device such as a turbocharger or supercharger including at least a compressor 60 arranged along the intake passage 42. For a turbocharger, the compressor 60 may be at least partially driven by a turbine 62, via, for example a shaft, or other coupling arrangement. The turbine 62 may be arranged along the exhaust passage 48. Various arrangements may be provided to drive the compressor. For a supercharger, the compressor 60 may be at least partially driven by the engine and/or an electric machine, and may not include a turbine. Thus, the amount of compression provided to one or more cylinders of the engine via a turbocharger or supercharger may be varied by the controller 12.

In the embodiment shown in FIG. 1, the compressor 60 may be driven primarily by the turbine 62. The turbine 62 may be driven by exhaust gases flowing through the exhaust passage 48. Thus, the driving motion of the turbine 62 may drive the compressor 60. As such, the speed of the compressor 60 may be based on the speed of the turbine 62. As the speed of the compressor 60 increases, more boost may be provided through the intake passage 42 to the intake manifold 44.

Further, the exhaust passage 48 may include a wastegate 26 for diverting exhaust gas away from the turbine 62. Additionally, the intake passage 42 may include a compressor bypass or recirculation valve (CRV) 27 configured to divert intake air around the compressor 60. The wastegate 26 and/or the CRV 27 may be controlled by the controller 12 to be opened when a lower boost pressure is desired, for example. For example, in response to compressor surge or a potential compressor surge event, the controller 12 may open the CBV 27 to decrease pressure at the outlet of the compressor 60. This may reduce or stop compressor surge.

The intake passage 42 may further include a charge air cooler (CAC) 80 (e.g., an intercooler) to decrease the temperature of the turbocharged or supercharged intake gases. In some embodiments, the CAC 80 may be an air to air heat exchanger. In other embodiments, the CAC 80 may be an air to liquid heat exchanger. The CAC 80 may also be a variable volume CAC. Hot charge air (boosted air) from the compressor 60 enters the inlet of the CAC 80, cools as it travels through the CAC, and then exits to pass through the throttle 21 and then enter the engine intake manifold 44. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point temperature. Further, when the charge air entering the CAC is boosted (e.g., boost pressure and/or CAC pressure is greater than atmospheric pressure), condensate may form if the CAC temperature falls below the dew point temperature. When the charge air includes recirculated exhaust gasses, the condensate can become acidic and corrode the CAC housing. The corrosion can lead to leaks between the air charge, the atmosphere, and possibly the coolant in the case of water-to-air coolers. Further, if condensate builds up in the CAC, it may be ingested by the engine during times of increased airflow. As a result, unstable combustion and/or engine misfire may occur.

The engine 10 may further include one or more oxygen sensors positioned in the intake passage 42, or engine intake. As such, the one or more oxygen sensors may be referred to as intake oxygen sensors. In the depicted embodiment, an intake oxygen sensor (IAO2) 162 is positioned downstream of the CAC 80, in the engine intake. In one example, the IAO2 162 may be positioned at an outlet of the CAC 80. As such, the IAO2 162 may be referred to herein as the CAC outlet oxygen sensor. In another example, the IAO2 162 may be positioned downstream of the CAC 80 outlet, in the intake manifold 44. In yet another example, the IAO2 may be positioned upstream of the throttle 21 and downstream of the CAC 80.

IAO2 162 may be any suitable sensor for providing an indication of the oxygen concentration of the charge air (e.g., air flowing through the intake passage 42), such as a linear oxygen sensor, intake UEGO (universal or wide-range exhaust gas oxygen) sensor, two-state oxygen sensor, etc. The IAO2 162 includes a heater, or heating element, configured to be activated in order to heat the IAO2 to its operating temperature. Specifically, the IAO2 may have a set point temperature such as 800° C. In another example, the set point temperature of the IAO2 may be greater or less than 800° C. A closed loop control system of the IAO2 may then control the heating element to maintain the set point temperature. For example, if the temperature of the sensor decreases below the set point, the heating element may consume more power output by the sensor in order to increase the sensor temperature. Further details on power consumption of the heating element to maintain a set point temperature of the IAO2 is discussed below.

The EGR dilution percentage of the intake charge at a given time (e.g., the proportion of combusted gases to air in an intake passage of the engine) may be inferred from the output of the IAO2 162. In particular, when oxygen intake concentration is reduced, an increase in EGR may be inferred since the presence of EGR may dilute oxygen in the intake stream at the IAO2 sensor 162. Conversely, when oxygen intake concentration increases, a decrease in EGR may be inferred due to a reduction of EGR. Controller 12 may estimate the percent dilution of the EGR flow based on feedback from IAO2 162. Further, the controller 12 may then estimate an EGR amount or EGR flow rate based on feedback from the IAO2 162. In some examples, the controller 12 may then adjust one or more of high pressure EGR valve 142, low pressure EGR valve 155, throttle 21, CRV 27, and wastegate 26 to achieve a desired EGR dilution percentage of the intake charge and/or desired EGR flow rate.

The controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10 for performing various functions to operate the engine 10. In addition to those signals previously discussed, these signals may include measurement of inducted mass air flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors that may send signals to controller 12 include a temperature and/or pressure sensor 124 at an outlet of a charge air cooler 80, the IAO2 162, and a boost pressure sensor 126. Other sensors not depicted may also be present, such as a sensor for determining the intake air velocity at the inlet of the charge air cooler, and other sensors. In some examples, storage medium read-only memory chip 106 may be programmed with computer readable data representing instructions executable by microprocessor unit 102 for performing the methods described below as well as other variants that are anticipated but not specifically listed. Example routines are described herein at FIG. 2.

The system of FIG. 1 provides for an engine system including an intake manifold including an intake throttle, a charge air cooler positioned upstream of the intake manifold, an oxygen sensor positioned at an outlet of the charge air cooler, the oxygen sensor including a heating element, and a controller with computer readable instructions for indicating water at the oxygen sensor in response to an increase in power consumption of the heating element of the oxygen sensor greater than a threshold during a select condition. The computer readable instructions may further include instructions for adjusting engine operating conditions based on the indicating water at the oxygen sensor, the engine operating conditions including one or more of an opening of the intake throttle and spark timing, wherein the select condition is responsive to ambient humidity greater than a threshold.

As described above, an intake oxygen sensor (IAO2) may be positioned downstream of a CAC for determining an oxygen concentration of the intake air. Specifically, the IAO2 sensor may be used to determine an EGR dilution percentage of the intake charge air and subsequently an estimate of EGR flow. However, IAO2 measurements may give an inaccurate indication of EGR flow if water from another source contacts the IAO2. For example, as discussed above, condensate may form within and then be expelled from the CAC. In this situation, the condensate may hit the IAO2 and cause the IAO2 to measure a higher water concentration than what may actually be attributed to the water vapor content of the EGR in the intake air. A higher EGR flow rate may then be indicated by the IAO2 sensor than the actual EGR flow rate. In some examples, using this inaccurate EGR measurement may trigger diagnostic routines such as EGR system diagnostics. Additionally, spark timing or other combustion parameters, such as injection timing, may be adjusted incorrectly responsive to the EGR flow estimate.

As introduced above, the IAO2 includes a heating element for maintaining an operating temperature of the sensor. When water contacts or splashes against the IAO2 the temperature of the heating element may decrease. As a result, a closed loop temperature controller of the IAO2 increases power supplied to the heating element to maintain the IAO2 temperature at the set point temperature. Thus, an increase in heating element power, or power consumption of the heating element, may indicate that water is present at the IAO2. This may, in turn, indicate that water is traveling through the intake manifold and toward cylinders of the engine.

If power consumption of the heating element increases by a threshold amount, water at the IAO2 and in the intake manifold may be indicated. In one example, a baseline power consumption value, $P_{base}$, may be determined during calibration of the IAO2. Specifically, the baseline power consumption of the IAO2 may be determined during a condition wherein no water is contacting the sensor in dry or humid air (e.g., substantially dry conditions). Then, during engine operation, if the heating element power consumption increases above the baseline power consumption level by a threshold amount, a controller (e.g., controller 12 shown in FIG. 1) may indicate water at the IAO2. This concept may be described with the following formula:

$$\Delta P = P_{measured} - P_{base},$$

where $\Delta P$ is the change in heating element power consumption during sensor operation, $P_{measured}$ is the measured power consumption of the heating element, and $P_{base}$ is the baseline power consumption of the heating element (without water contacting the sensor). If $\Delta P$ is greater than a threshold power (e.g., water splash threshold), water at the IAO2 may be indicated. The threshold power, or threshold amount of power increase, may be based on a threshold amount of water that may reduce the accuracy of EGR estimates and/or a threshold amount of water that may decrease combustion stability.

Additionally, an amount of water at the IAO2 or a rate of water contacting the IAO2 may be determined based on the amount of increase in heating element power, or power consumption, from the baseline power consumption level. For example, as $\Delta P$ increases, the amount of water and/or the rate of accumulation of water at the IAO2 may also increase. Thus, as $\Delta P$ increases, an amount of water being ingested by the engine may also increase. As a result, engine misfire and/or unstable combustion may occur.

In response to an indication that water is at the IAO2, the controller may disable select engine system diagnostics and/or take mitigating actions responsive to water ingestion at the intake manifold. In one example, responsive to water indication at the IAO2, the controller may disable EGR system diagnostics. For example, adjustments to EGR flow rate and/or combustion parameters responsive to estimates of EGR flow may be temporarily disabled until water is no longer at the IAO2 (e.g., the power consumption has decreased below the threshold). In another example, responsive to water indication at the IAO2, the controller may disable diagnosis of the IAO2 heating element. For example, the increase in heating element power consumption may result in indications of heating element degradation and/or over-current readings. Thus, during water splash conditions at the IAO2 (e.g., when $\Delta P$ is greater than the threshold), indicating IAO2 degradation may be disabled. In yet another example, responsive to water indication at the IAO2, airflow to the engine may be adjusted to control a rate of water ingestion to the engine below a rate which may cause engine misfire and/or unstable condition. Specifically, a throttle opening may be reduced to reduce airflow and the rate of water ingestion to the engine. The amount of reducing the throttle opening may be based on the amount of water at the IAO2. For example, as the amount of water at the IAO2 increases (e.g., as the heating element power consumption increases further above baseline), the opening of the throttle may be reduced by a larger amount. In another example, responsive to water indication at the IAO2, the controller may adjust spark timing and/or alternate combustion parameters to account for increased water in the engine cylinders. Specifically, the controller may adjust spark timing based on the amount of water estimated at the IAO2.

In this way, an engine method may include indicating water at an oxygen sensor positioned in an engine intake based on a transient increase in power consumed by a heating element of the oxygen sensor. In one example, the oxygen sensor is positioned at an outlet of a charge air cooler. The method may further include disabling exhaust gas recirculation system diagnostics responsive to the indicating water at the oxygen sensor. Additionally, the method may include temporarily disabling an oxygen sensor heating element degradation indication responsive to the indicating water at the oxygen sensor, a duration of the disabling responsive to a rate of power increase. As a result, changes in power consumption of the heating element may not trigger an indication of heating element degradation when water is indicated at the oxygen sensor.

In one example, indicating water includes indicating an amount of water at the oxygen sensor based on the transient increase in power consumed by the heating element. The method may further include adjusting a position of an intake throttle responsive to the indicating water at the oxygen sensor to control a rate of water ingestion below a threshold rate. In one example, the transient increase in power is based on a temporary increase in a rate of power consumption. Adjusting the position of the intake throttle may include decreasing an opening of the intake throttle to decrease airflow through an intake manifold below the threshold rate, the decreasing the airflow increasing with increasing amount of water at the oxygen sensor. Said another way, as the amount of water at the oxygen sensor increases, the airflow may be decreased by a larger amount (e.g., throttle opening may be reduced by a larger amount). Additionally, spark timing may be adjusted based on the amount of water at the oxygen sensor. For example, adjusting spark timing may include advancing spark timing when a pedal position is increasing and retarding spark timing when the pedal position is below a threshold position. In another example, indicating water includes indicating a rate of water ingestion at the intake manifold based on the transient increase in power consumed by the heating element.

FIG. 2 shows a method 200 for indicating water at an oxygen sensor and adjusting engine operating conditions responsive to the water indication. Specifically, the oxygen sensor may be an intake oxygen sensor positioned in an intake of an engine, proximate to an outlet of a CAC (e.g., such as the intake oxygen sensor 162 shown in FIG. 1). In one example, the method 200 is executable by the controller 12 shown in FIG. 1.

The method begins at 202 by estimating and/or measuring engine operating conditions. Engine operating conditions may include engine speed and load, pedal position, mass air flow, torque demand, EGR flow, oxygen sensor measurements, conditions of the CAC (e.g., temperature and pressure), ambient temperature and pressure, etc. At 204, the method includes determining heater (e.g., heating element) power consumption of the intake oxygen sensor (IAO2). Then at 206, the method includes determining if the difference between the measured power consumption and the baseline power consumption (e.g., $\Delta P$) of the heating element is greater than a threshold. As discussed above, the threshold may be a threshold power or threshold amount of power increase. The threshold may be based on a threshold increase in power corresponding to a threshold amount of water that may reduce the accuracy of EGR estimates by a certain percentage (e.g., 10%) and/or a threshold amount of water that may decrease combustion stability.

If the difference between the measured power consumption and the baseline power consumption of the heating element is not greater than the threshold, the method continues on to 208 to determine EGR based on the IAO2 measurement (e.g., output). As described above, IAO2 measurements may indicate an EGR dilution percentage of the intake air. This EGR dilution percentage may then be used to infer EGR flow. The method at 208 further includes enabling EGR system and IAO2 diagnostics. As a result, at 209, the controller may adjust EGR combustion parameters (e.g., spark timing, injection timing, etc.) based on the determined EGR dilution percentage. Additionally, at 210, the method includes adjusting an EGR valve to deliver the desired EGR flow. The desired EGR flow may be based on a desired intake air dilution percentage, additional engine operating conditions, and/or the determined EGR flow.

Alternatively at 206, if the difference between the measured power consumption and the baseline power consumption of the heating element is greater than the threshold, the method continues on to 212 to indicate water at the IAO2. Indicating water at the IAO2 may also include indicating water in the intake manifold and increased water ingestion by the engine. In response to indicating water at the IAO2, the controller may disable EGR system diagnostics at 214. As discussed above, disabling EGR system diagnostics may include disabling engine operating parameter adjustments based on EGR flow estimates, the EGR flow estimates based on IAO2 sensor readings. Additionally, the method at 214 may include disabling IAO2 diagnostics that may indicate IAO2 heating element degradation. For example, if IAO2 heating element degradation is indicated based on the increased power consumption, no indication of degradation may be indicated while water is indicated at the IAO2. In this way, incorrect heating element degradation indications may be reduced.

At 216, the method includes determining an amount of water at the IAO2 based on the difference between the measured power consumption and the baseline power consumption, $\Delta P$. As discussed above, as $\Delta P$ increases, the amount of water indicated at the IAO2 may increase. In another example, the method at 216 may additionally or alternatively include determining the rate of water accumulation at the IAO2, or the rate of water ingestion at the intake manifold based on $\Delta P$. Similarly, as $\Delta P$ increases the rate of water accumulation may also increase. At 218, the controller may adjust airflow to the intake manifold and/or spark timing based on the amount of water at the IAO2. For example, the controller may adjust an opening of an intake throttle to control the rate of water ingestion at the intake manifold and into the engine. In one example, the controller may reduce the throttle opening to reduce airflow to the engine. As a result, the water in the intake manifold may be ingested at a rate which may reduce engine misfire or unstable combustion. In another example, the controller may adjust spark timing to reduce combustion instability during water ingestions. For example, adjusting spark timing during water ingestion may include advancing spark timing when a pedal position is increasing (e.g., during a tip-in). In another example, adjusting spark timing during water ingestion may include retarding spark timing when a pedal position is below a threshold position. The amount of spark retard or advance may be based on the amount of water determined at the IAO2. In other embodiments, additional or alternative combustion parameters, such as injection timing, may be adjusted responsive to $\Delta P$ and the amount of water at the IAO2.

In some embodiments, method 200 may further include closing the EGR valve or reducing an opening of the EGR valve to reduce EGR flow responsive to water indication at the IAO2 at 212. Thus, in some examples the method may include an additional step after 216 that includes adjusting EGR flow based on the amount of water in the intake manifold (as determined based on $\Delta P$). Reducing EGR flow may reduce an amount of additional water vapor entering the engine cylinders.

At 220, the method includes returning spark timing and throttle position to demanded levels when heater (e.g., heating element) power consumption returns to $P_{base}$. The method at 220 may further include enabling EGR system and IAO2 heater diagnostics when heater power consumption returns to $P_{base}$. As such, EGR flow may be determined based on IAO2 output, as described at 208. EGR combustion parameters and EGR flow may then be adjusted based on the estimated EGR flow, as described at 209 and 210.

In this way, an engine method may include adjusting a turbocharger compressing engine intake air, adjusting a direct injection of fuel to the engine, cooling compressed air in a charge air cooler, and adjusting engine operating conditions responsive to power consumption of a heating element of an oxygen sensor in the compressed air increasing above a baseline power consumption level by a threshold amount, the oxygen sensor positioned downstream of the charge air cooler. Adjusting engine operating conditions may include one or more of disabling exhaust gas recirculation diagnostics and disabling indication of oxygen sensor heating element degradation. The method may further include estimating one or more of an amount of water and a rate of water ingestion at the intake manifold based on the power consumption of the heating element, the amount of water and the rate of water ingestion increasing with increasing power consumption. Adjusting engine operating conditions may additionally or alternatively include adjusting one or more of airflow to the intake manifold and spark timing based on one or more of the amount of water and the rate of water ingestion at the intake manifold.

In one example, the threshold amount is based on a threshold amount of water resulting in reduced accuracy of exhaust gas recirculation flow estimates or decreased combustion stability. Additionally, the baseline power consumption may be based on heating element power consumption under dry conditions.

The method may further include enabling exhaust gas recirculation system diagnostics and determining exhaust gas recirculation flow based on output of the oxygen sensor when the power consumption of the heating element is less than the threshold amount above the baseline power consumption level. The method may then also include adjusting exhaust gas recirculation combustion parameters based on the determined exhaust gas recirculation flow. In one example, an exhaust gas recirculation valve may be adjusted to deliver a desired exhaust gas recirculation flow, the desired exhaust gas recirculation flow based on engine operating conditions and the determined exhaust gas recirculation flow.

Figure 3:
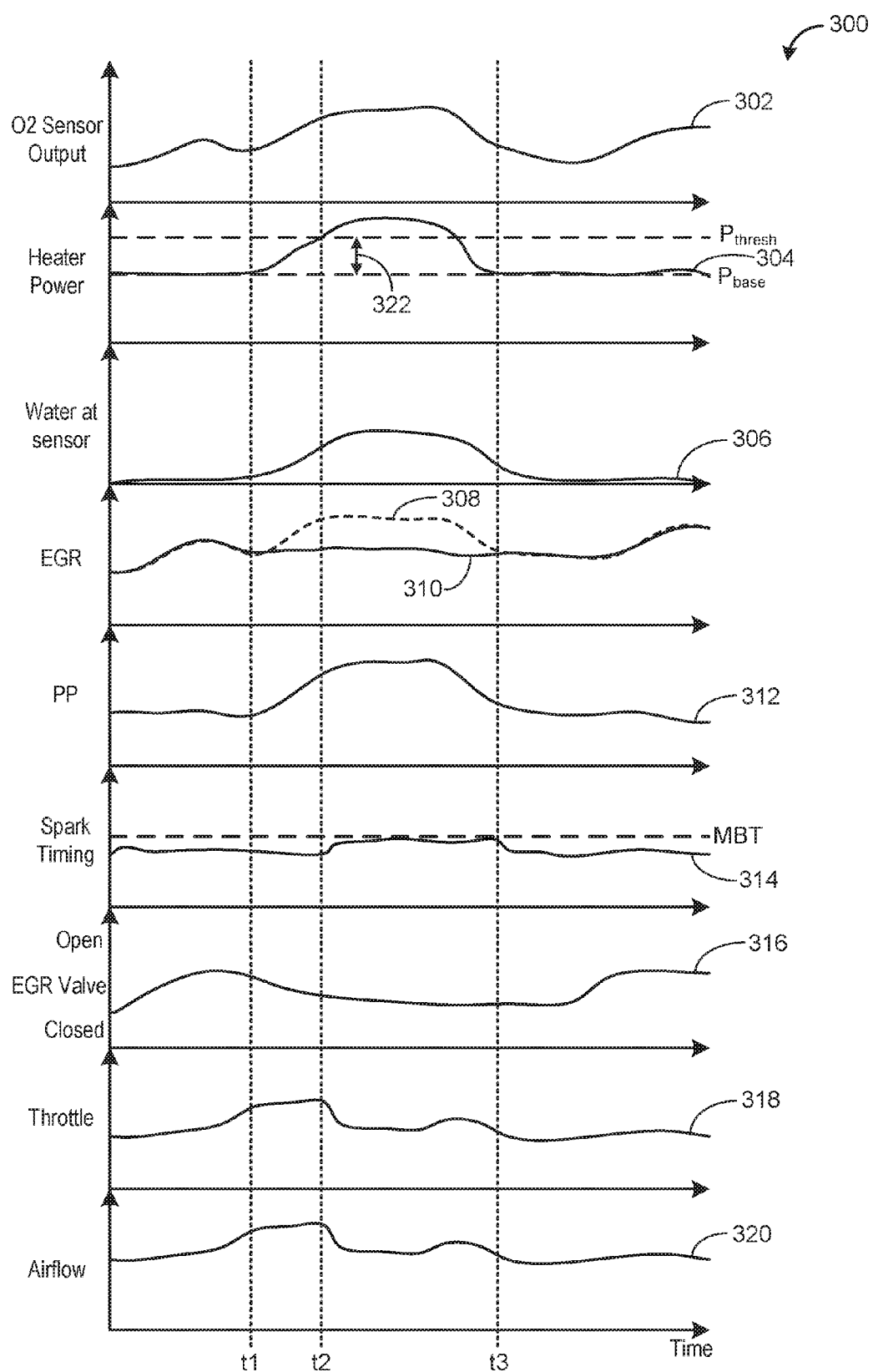
FIG. 3 is a graph of example engine operating parameter adjustments based on water indicated at an intake oxygen sensor.

FIG. 3 shows a graphical example of adjusting engine operating parameters based on water indicated at an intake oxygen sensor. Specifically, graph 300 shows changes in IAO2 output at 302, changes in heater (e.g., heating element) power consumption at plot 304, changes in water determined at the IAO2 at plot 306, changes in estimated EGR flow at plot 308, changes in actual EGR flow at plot 310, changes in pedal position (PP) at plot 312, changes in spark timing with respect to MBT at plot 314, changes in a position of an EGR valve at plot 316, changes in a throttle opening at plot 318, and changes in airflow to the engine at plot 320. As discussed above, the IAO2 is positioned in the intake, downstream of the CAC. In one example, the IAO2 may be positioned at the outlet of the CAC. The IAO2 output may be an oxygen concentration or estimated amount of oxygen in the charge air. An EGR dilution percentage of the charge air may be inferred from this output and used to determine the estimated EGR flow at plot 308. Additionally, the water determined at the IAO2 may be an amount of water or rate of water accumulation at the IAO2, the amount of water and rate of water accumulation based on the heater power consumption.

Prior to time t1, the heater power consumption of the IAO2 is around the baseline power consumption level, $P_{base}$ (plot 304). At this time the estimated EGR flow and the actual EGR flow may be substantially the same (plots 308 and 310, respectively). At time t1, heater power consumption begins to increase (plot 304). IAO2 output (plot 302), estimated EGR flow (plot 308), and water determined at the IAO2 (plot 306) may also increase after time t1. At time t2, heater power consumption increases to an upper power threshold, $P_{thresh}$ (plot 304). The difference between $P_{thresh}$ and $P_{base}$ may be a threshold amount 322 of power increase (e.g., $P_{measured} - P_{base} >$ threshold amount). As a result, a controller may indicate water at the IAO2. Due to water contacting the IAO2, the estimated EGR flow (plot 308) is higher than the actual EGR flow (plot 310) between time t2 and time t3.

In response to water indication at the IAO2 at time t2, the controller may disable EGR system diagnostics and/or heater degradation indications. For example, as shown in FIG. 3, the position of the EGR valve may be maintained even though the estimated EGR flow (plot 308) has increased. Also at time t2, in response to water indication at the IAO2, the throttle opening may be reduced (plot 318) in order to reduce airflow to the engine (plot 320). Reducing airflow in this way may reduce a rate of water ingestion into the engine. Additionally, in response to water indication at the IAO2, spark timing may be adjusted (plot 314). Since PP is increasing before time t2 (plot 312), spark timing may be advanced at time t2.

At time t3, the IAO2 heater power consumption decreases back to $P_{base}$ (plot 304). In response, spark timing and throttle positioned are returned to demanded levels. Further, EGR system diagnostics and IAO2 heater diagnostics (e.g., indicating degradation of heater based on power consumption) may be re-enabled. As such, after time t3, combustion parameters and EGR flow may be adjusted based on EGR flow estimates determined from IAO2 output.

In this way, water at an oxygen sensor positioned in an intake may be indicated based on increased power consumption of a heating element of the oxygen sensor. Water indication may indicate possible water ingestion by the engine, through the intake manifold. As discussed above, when power consumption of the heating element increases above a baseline power consumption level by a threshold amount, an engine controller may adjust engine operating parameters and/or disable EGR and IAO2 heater diagnostics. As such, EGR flow estimates based on IAO2 may not be used to adjust combustion parameters and/or an EGR valve while water is indicated at the IAO2. By indicating water at the oxygen sensor, a technical effect is achieved by adjusting engine operating parameters to increase engine control and combustion stability during conditions wherein water is being ingested by the engine.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
indicating water at an oxygen sensor positioned in an engine intake, downstream of a compressor, based on a transient increase in power consumed by a heating element of the oxygen sensor; and
adjusting an operating parameter responsive to the indication of water.

2. The method of claim 1, wherein adjusting the operating parameter includes disabling exhaust gas recirculation system diagnostics responsive to the indicating water at the oxygen sensor.

3. The method of claim 1, wherein adjusting the operating parameter includes temporarily disabling an oxygen sensor heating element degradation indication responsive to the indicating water at the oxygen sensor, a duration of the disabling responsive to a rate of power increase.

4. The method of claim 1, wherein indicating water includes indicating an amount of water at the oxygen sensor based on the transient increase in power consumed by the heating element, wherein the engine is a direct fuel injection engine.

5. The method of claim 4, wherein adjusting the operating parameter includes adjusting a position of an intake throttle responsive to the indicating water at the oxygen sensor to control a rate of water ingestion below a threshold rate, wherein the transient increase in power is based on a temporary increase in a rate of power consumption.

6. The method of claim 5, wherein adjusting the position of the intake throttle includes decreasing an opening of the intake throttle to decrease airflow through an intake manifold below the threshold rate, the decrease in the airflow increasing with increasing the amount of water at the oxygen sensor.

7. The method of claim 4, further comprising adjusting spark timing based on the amount of water at the oxygen sensor.

8. The method of claim 7, wherein adjusting spark timing includes advancing spark timing when a pedal position is increasing and retarding spark timing when the pedal position is below a threshold position, and wherein the compressor is coupled to an electric machine.

9. The method of claim 1, wherein indicating water includes indicating a rate of water ingestion at an intake manifold based on the transient increase in power consumed by the heating element, and wherein adjusting the operating parameter includes disabling exhaust gas recirculation system diagnostics responsive to the indicating water at the oxygen sensor and temporarily disabling an oxygen sensor heating element degradation indication responsive to the indicating water at the oxygen sensor, a duration of the disabling responsive to a rate of power increase.

10. The method of claim 1, wherein the oxygen sensor is positioned at an outlet of a charge air cooler upstream of engine cylinders and upstream of a throttle.

11. An engine method, comprising:
adjusting a turbocharger compressing engine intake air;
adjusting a direct injection of fuel to the engine;
cooling compressed air in a charge air cooler, and
adjusting engine operating conditions responsive to power consumption of a heating element of an oxygen sensor in the compressed air increasing above a baseline power consumption level by a threshold amount, the oxygen sensor positioned downstream of the charge air cooler and upstream of a throttle.

12. The method of claim 11, wherein adjusting engine operating conditions includes one or more of disabling exhaust gas recirculation diagnostics and disabling an indication of oxygen sensor heating element degradation.

13. The method of claim 11, further comprising estimating one or more of an amount of water and a rate of water ingestion at an intake manifold based on the power consumption of the heating element, the amount of water and the rate of water ingestion increasing with increasing power consumption.

14. The method of claim 13, wherein adjusting engine operating conditions includes adjusting one or more of airflow to the intake manifold and spark timing based on one or more of the amount of water and the rate of water ingestion at the intake manifold.

15. The method of claim 11, wherein the threshold amount is based on a threshold amount of water resulting in reduced accuracy of exhaust gas recirculation flow estimates or decreased combustion stability and wherein the baseline power consumption level is based on heating element power consumption under dry conditions.

16. The method of claim 11, further comprising enabling exhaust gas recirculation system diagnostics and determining exhaust gas recirculation flow based on output of the oxygen sensor when the power consumption of the heating element is less than the threshold amount above the baseline power consumption level.

17. The method of claim 16, further comprising adjusting exhaust gas recirculation combustion parameters based on the determined exhaust gas recirculation flow.

18. The method of claim 16, further comprising adjusting an exhaust gas recirculation valve to deliver a desired exhaust gas recirculation flow, the desired exhaust gas recirculation flow based on engine operating conditions and the determined exhaust gas recirculation flow.

19. A system for an engine, comprising:
an intake manifold including an intake throttle;
a compressor coupled upstream of the throttle;
a charge air cooler positioned upstream of the intake manifold;
an oxygen sensor positioned at an outlet of the charge air cooler and upstream of the throttle, the oxygen sensor including a heating element; and
a controller with computer readable instructions for indicating water at the oxygen sensor in response to an increase in power consumption of the heating element of the oxygen sensor greater than a threshold during a select condition.

20. The system of claim 19, wherein the computer readable instructions further include instructions for adjusting engine operating conditions based on the indicating water at the oxygen sensor, the engine operating conditions including one or more of an opening of the intake throttle and spark timing, wherein the select condition is responsive to ambient humidity greater than a threshold, and wherein the compressor is at least partially driven by an electric machine.

* * * * *